(12) United States Patent
Steinberg et al.

(10) Patent No.: US 6,827,503 B2
(45) Date of Patent: Dec. 7, 2004

(54) OPTICAL DEVICE PACKAGE HAVING A CONFIGURED FRAME

(75) Inventors: Dan A. Steinberg, Blacksburg, VA (US); Mindaugas F. Dautartas, Blacksburg, VA (US)

(73) Assignee: Shipley Company, L.L.C., Marlborough, MA (US)

( * ) Notice: Subject to any disclaimer, the term of this patent is extended or adjusted under 35 U.S.C. 154(b) by 0 days.

(21) Appl. No.: 09/990,509

(22) Filed: Nov. 21, 2001

(65) Prior Publication Data

US 2003/0123816 A1 Jul. 3, 2003

Related U.S. Application Data

(60) Provisional application No. 60/250,943, filed on Dec. 1, 2000.

(51) Int. Cl.[7] ............................... G02B 6/42; G02B 6/30
(52) U.S. Cl. ............................ 385/92; 385/49; 385/94
(58) Field of Search ........................... 385/92–94, 49, 385/52

(56) References Cited

U.S. PATENT DOCUMENTS

| | | | |
|---|---|---|---|
| 3,404,215 A | 10/1968 | Burks et al. | |
| 3,768,991 A | 10/1973 | Rogers | |
| 3,874,549 A | 4/1975 | Hascoe | |
| 4,038,157 A | 7/1977 | Kim et al. | |
| 4,065,203 A | 12/1977 | Goell et al. | |
| 4,199,222 A | 4/1980 | Ikushima et al. | |
| 4,270,134 A | 5/1981 | Takeda et al. | |
| 4,791,075 A | 12/1988 | Lin | |
| 4,802,952 A | 2/1989 | Kobori et al. | |
| 4,897,711 A | 1/1990 | Blonder et al. | |
| 4,907,065 A | 3/1990 | Sahakian | |
| 5,323,051 A | 6/1994 | Adams et al. | |
| 5,412,748 A | 5/1995 | Furuyama et al. | |
| 5,454,055 A | 9/1995 | Kragl et al. | |
| 5,475,778 A | 12/1995 | Webb | |
| 5,550,398 A | 8/1996 | Kocian et al. | |
| 5,557,695 A | * 9/1996 | Yamane et al. | ................ 385/49 |
| 5,604,160 A | 2/1997 | Warfield | |
| 5,671,315 A | 9/1997 | Tabuchi et al. | |
| 5,798,557 A | 8/1998 | Salatino et al. | |
| 5,915,168 A | 6/1999 | Salatino et al. | |
| 5,960,141 A | 9/1999 | Sasaki et al. | |
| 6,106,735 A | 8/2000 | Kurle et al. | |
| 6,228,675 B1 | 5/2001 | Ruby et al. | |

* cited by examiner

Primary Examiner—Hemang Sanghavi
Assistant Examiner—Michael J. Stahl
(74) Attorney, Agent, or Firm—Jonathan D. Baskin

(57) ABSTRACT

An optical device package includes a substrate, optical semiconductor component, optical fiber, frame and lid. The substrate has a longitudinal notch for mounting the optical fiber and a lateral groove with a proximally facing stop surface. The frame includes at least one downwardly extending projection configured and dimensioned so as to engage a lateral end portion of the lateral groove. The frame is self-aligning and seats itself by being dropped into place.

22 Claims, 5 Drawing Sheets

OPTICAL DEVICE PACKAGE HAVING A CONFIGURED FRAME

CROSS REFERENCE TO RELATED APPLICATIONS

This application claims priority to U.S. provisional application Ser. No. 60/250,943 filed Dec. 1, 2000.

BACKGROUND

1. Technical Field

The present disclosure relates to a package for optical devices, and particularly to a module for operatively coupling one or more optical fibers with one or more optical devices.

2. Description of the Related Art

Various optical devices are known in the art and include such semiconductor devices as light emitting diodes (LEDs), laser diodes, and photodetectors. Optical semiconductors, e.g., optoelectronic devices, effect a conversion between optical signals and electronic signals.

Optical semiconductor components are sensitive to environmental conditions and are generally sealed in hermetic packages or in plastic molding to prevent degradation caused by atmospheric contaminants such as humidity, dust, and free ions. The optical input/output surfaces of the components operatively coupled in a package are especially susceptible to contamination, hence, the desirability of hermetically sealing the package to prevent contact with the outside atmosphere. Hermetic sealing typically involves mounting a cap to a substrate having an optical semiconductor component by means of soldering, welding, and the like.

One prior known optical semiconductor module includes a submount body having a groove, an optical semiconductor component mounted on the submount body, a cap arranged across the groove and fixedly bonded to the submount body by a bonding member for hermetically sealing the module. An electrical wiring layer connected to the semiconductor device extends to the outside of the cap through the groove.

Another optical module includes a mounting board, an optical element, and an optical fiber mounted into a longitudinal groove in the mounting board. A lateral fiber-stop groove provides a stop surface against which the end of the optical fiber is abutted. The fiber-stop groove is typically formed by means of a dicing saw.

A problem associated with the fiber-stop groove is the increased difficulty of achieving a hermetic seal. This difficulty is overcome by the method and device disclosed herein.

SUMMARY

An optical device package is provided herein which comprises a substrate having an upper surface and a longitudinal notch extending from the proximal end of the substrate to a lateral groove which is at least partially defined by a proximal facing stop surface. An optical semiconductor component is mounted to the upper surface of the substrate distal to the lateral groove. An optical fiber is positioned within the longitudinal notch, the optical fiber being operatively aligned with the optical semiconductor component. Preferably, the distal end of the optical fiber abuts the proximal facing stop surface of the substrate. The optical device package further includes a frame mounted to the upper surface of the substrate, the frame having at least one downwardly extending projection that engages the lateral groove. A lid is optionally mounted to the frame so as to define an inner space wherein the optical semiconductor component and at least a portion of the optical fiber are enclosed.

The optical device package described herein advantageously is easier to assemble while achieving a hermetic seal. The frame is self-aligning and can seat itself into proper engagement with the substrate by simply being dropped into place.

BRIEF DESCRIPTION OF THE DRAWINGS

Various embodiments are described below with reference to the drawings wherein.

DETAILED DESCRIPTION OF PREFERRED EMBODIMENT(S)

Such terms as "proximal" and "distal", "upper" and "lower", "horizontal" and "vertical", are herein used relative to each other and not to any fixed external frame of reference.

Figure 1:
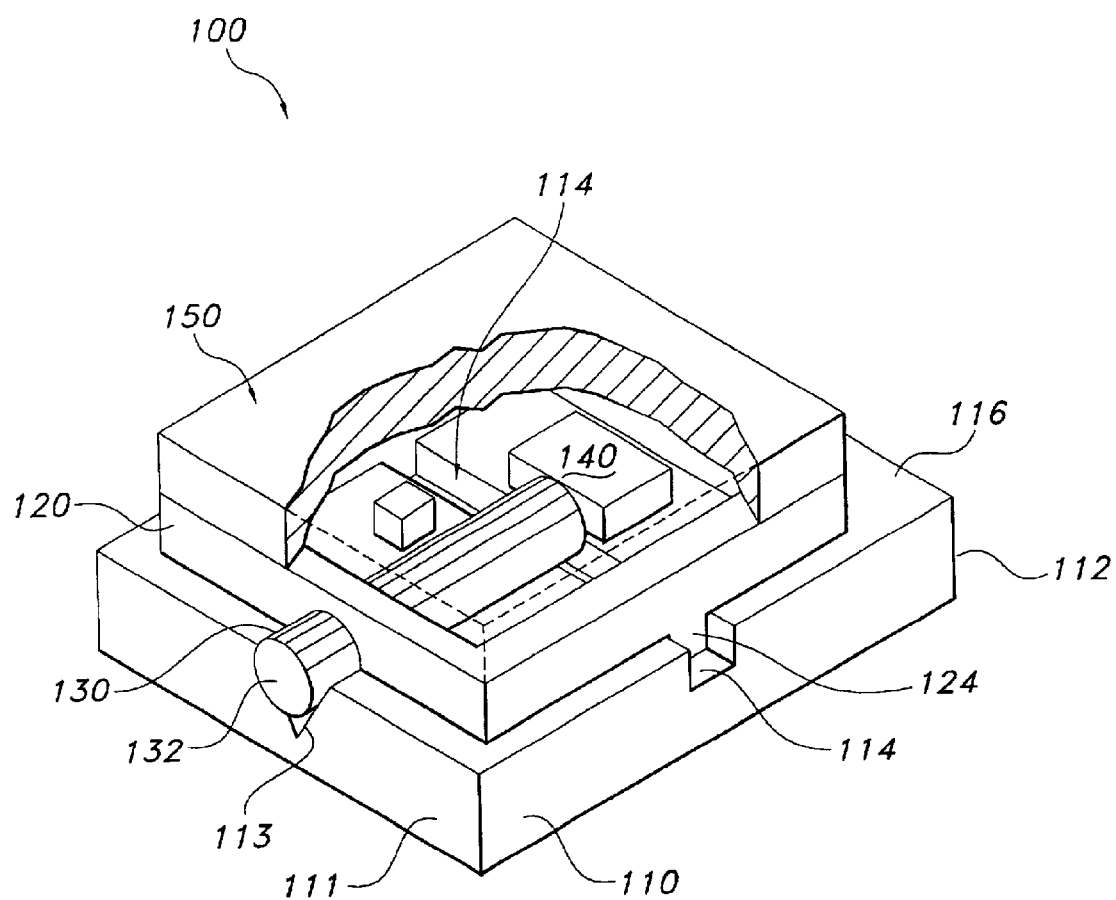
FIG. 1 is a partially cut-away perspective view of the optical device package in accordance with this disclosure.
Figure 3:
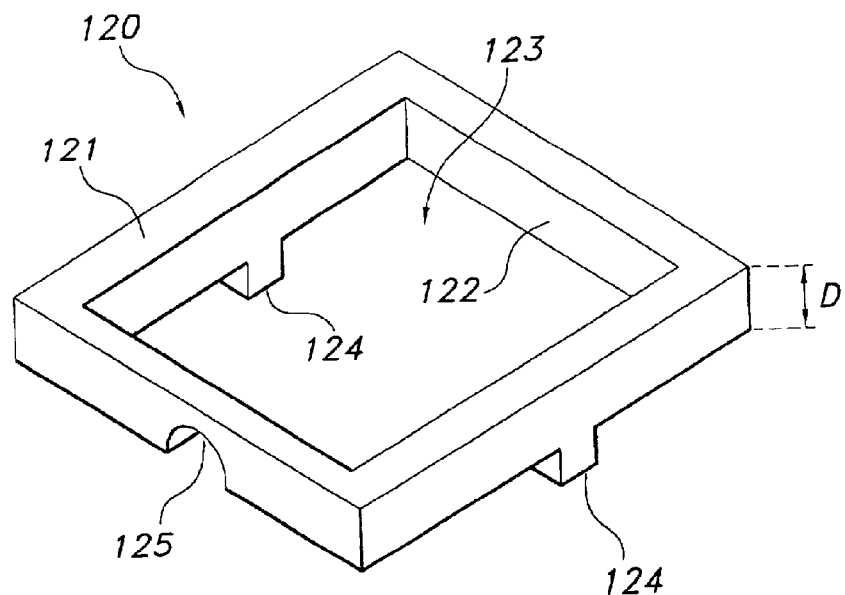
FIG. 3 is a perspective view of the frame.
Figure 4:
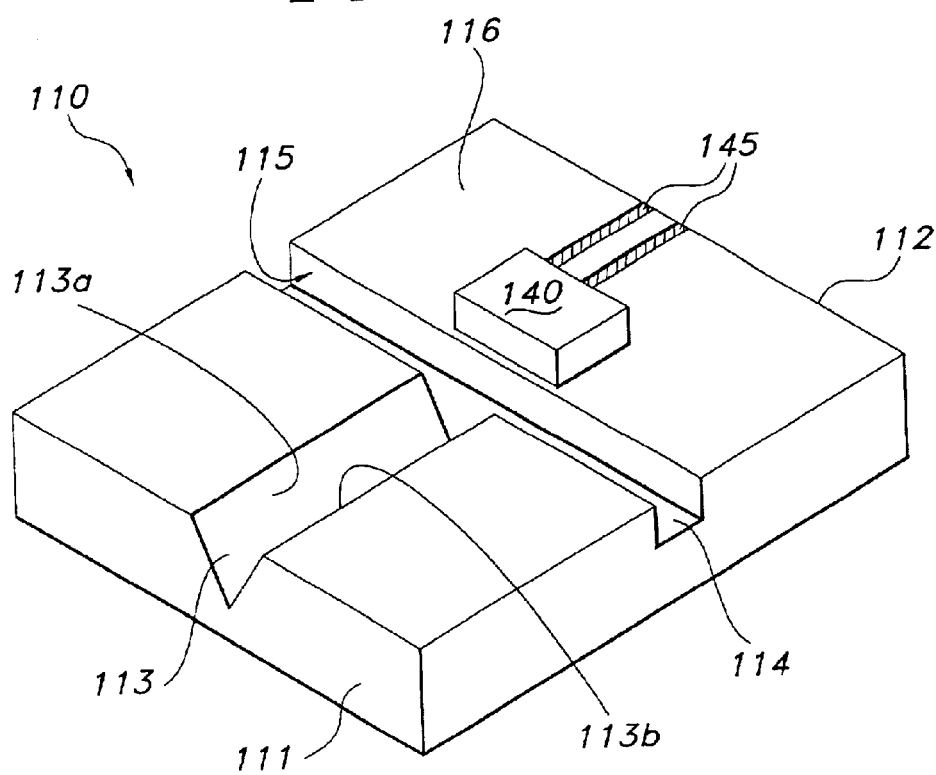
FIG. 4 is a perspective view of the substrate and optical semiconductor component.

Referring to the drawings, FIGS. 1, 3 and 4 illustrate an optical device package 100 having a substrate 110 in combination with an optical signal carrier, i.e., optical fiber stub 130, a frame 120, and optionally an optical semiconductor component 140 and a lid 150.

More particularly, substrate 110 can be any material suitable for providing an optical bench. A preferred material for fabricating substrate 110 is silicon. Other suitable materials include ceramics, polymers and metals. Substrate 110 has a proximal end 111, a distal end 112, and a horizontal upper major surface 116. Substrate 110 is formed by etching and/or cutting or other suitable method to provide a longitudinal notch 113 for receiving the optical fiber stub 130. A lateral groove 114 is likewise formed for providing a vertical proximally facing stop surface 115 which is perpendicular to the direction of the optical axis of the optical fiber 130. Stop surface 115 is also substantially perpendicular to the plane of upper surface 116 of the substrate. Notch 113 preferably has a V-shaped cross section and is typically referred to as a "V-groove," although other cross sectional configurations such as U-shaped cross sections (e.g., semicircular, square, rectangular, etc.) are also contemplated. Preferably, substrate 110 is single crystal silicon with the upper major surface 116 in the (100) crystallographic plane. The upper surface 116 can be masked and selectively etched to form angled surfaces 113*a* and 113*b* of the V-shaped notch 113 in the (111) crystallographic planes. The lateral groove 114 can preferably be formed by cutting the upper surface 116 with a dicing saw. The depth of V-shaped notch 113 and lateral groove 114 can be any suitable depth for accommodating the optical fiber 130, and illustratively may range from about 50 microns to about 500 microns.

Figure 2:
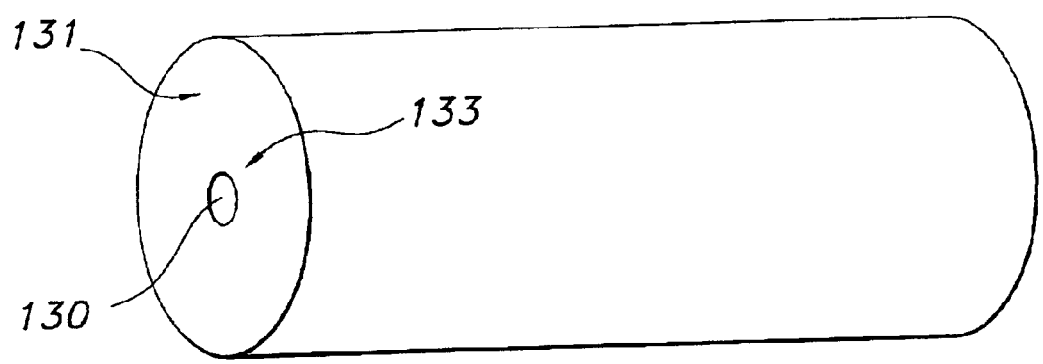
FIG. 2 is a perspective view showing an optical fiber disposed through a ferrule.

Optical fiber stub 130 can be any conventional optical fiber and is typically from about 1 mm to about 5 mm in length, although lengths outside of this range can also be employed when suitable. Optical fiber stub 130 typically has a diameter of about 125 microns (standard). However, larger or smaller diameters can be employed when suitable. The optical fiber stub 130 is mounted in longitudinal V-shaped notch 113, preferably such that the distal end of the optical fiber 130 abuts and is flush against the proximally facing stop surface 115 of the lateral groove 114. Alternatively, as shown in FIG. 2, the optical fiber 130 can be disposed through an axial bore 133 in ferrule 131, the ferrule 131 being disposed between substrate 110 and frame 120. The ferrule 131 can be fabricated from, for example, ceramic or glass, and typically has a diameter ranging from about 1 mm to about 3 mm. The optical fiber 130 can be secured within the axial bore of the ferrule by a bonding agent such as, for example, solder glass, epoxy resin, and the like.

The optical semiconductor component 140 is an optional component preferably mounted on the upper surface 116 of the substrate distal of the lateral groove 114 and can be any suitable semiconductor device for emitting or receiving light, such as for example, a laser diode, light emitting diode (LED), or a photodetector. At least one, and preferably two, electrically conductive leads 145 extend from the optical semiconductor component along the upper surface 116 of substrate 110 to at least the distal edge 112 of the substrate so as to enable the optical semiconductor component to be electrically connected to a power source or various other components of an electrical circuit. Such optical semiconductor components are well known in the art. The electrical leads 145 are preferably formed as thin films from conductive materials such as aluminum or copper by, for example, vapor deposition, or other suitable technique.

Frame 120 is an intermediate support structure preferably fabricated from a ceramic, glass, or silicon or other material which does not plastically deform at the temperatures used to process and fabricate the optical device package 100 and includes a single piece member 121 having an inner edge 122 which defines an opening 123. Single piece member 121 preferably has a band-like structure circumscribing the opening 123 and is preferably quadrilateral in shape although other shapes such as circular or oval are also contemplated as being within the scope of the invention. Frame 120 further includes a recess 125 configured to accommodate the optical fiber 130 (or ferrule 131), and at least one, and preferably two, downwardly extending projections 124 configured to engage the respective lateral end portions of groove 114 in the substrate. The projections 124 can be rectangular in shape to match the cross sectional configuration of groove 114. Alternatively, other shapes can be used when deemed appropriate. Frame 120 can be of any suitable shape or dimensions. Preferably, frame 120 has a thickness D (see, FIG. 3) ranging from about 100 microns to about 1,000 microns.

Frame 120 is fixedly bonded to the upper surface 111 of the substrate such that opening 122 is over the optical semiconductor component 140 and at least a portion of the optical fiber 130. Bonding of frame 120 to substrate 110 can be achieved by any suitable means such as soldering with metal, bonding with solder glass frit or BCB (benzocyclobutene resin), or adhesives such as epoxy resins, etc. The frame can be metallized or roughened, if necessary, to facilitate soldering or bonding.

Solder glass frit is a low melting point glass such as, for example, borate glass, lead zinc borate glass, and the like. Generally, solder glass frit has a melting point of from about 300° C. to about 800° C., typically 325° C. to about 500° C. Solder glass frit suitable for use in the present invention is commercially available, for example, from Schott Glass Technologies of Duryea, Pa.

Figure 5:
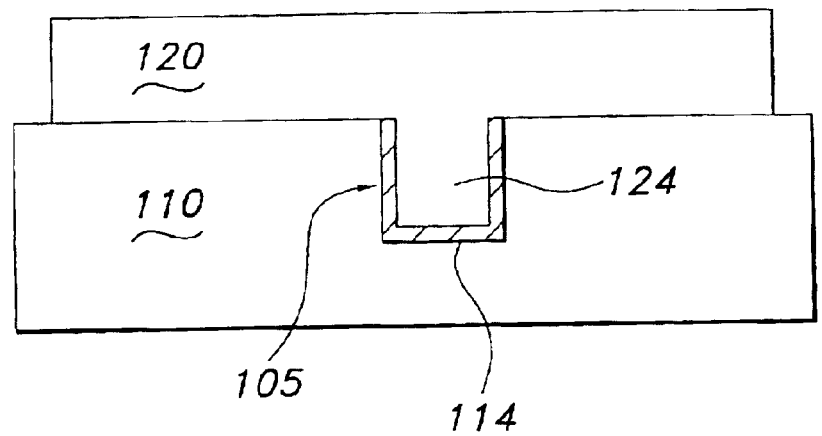
FIG. 5 is a side view of the frame mounted to the substrate in accordance with this disclosure.

Referring now to FIG. 5, it can be seen that when the frame 120 is mounted to substrate 110 the downwardly extending projection 124 engages the lateral groove 114. The projection 124 is preferably configured to at least approximately match the shape of the groove 114. However, the match does not have to be exact. Any gap between the projection 124 and groove 114 can be occupied by a gap filling sealant 105 such as solder glass, epoxy resin, and the like, thereby providing a hermetic seal. The frame 120 is advantageously self-aligning. That is, the frame 120 can be dropped into place onto the substrate 110 and will seat itself upon the engagement of the projections 124 with the lateral groove 114 and the engagement of the recess 125 with the optical fiber 130. Active alignment by the manufacturer is not required.

Referring to FIG. 1, groove 113 is configured and dimensioned such that the axial center 132 of optical fiber stub 130, i.e., the optical axis, is aligned with the active area of the optical semiconductor component 140. This permits optical signals to be communicated between the optical fiber 130 and the optical semiconductor component 140. Optionally, other components such as a lens, filter, modulator, etc., can be included in the optical device package 100 and interposed between the optical fiber 130 and the optical semiconductor component 140.

Figure 6:
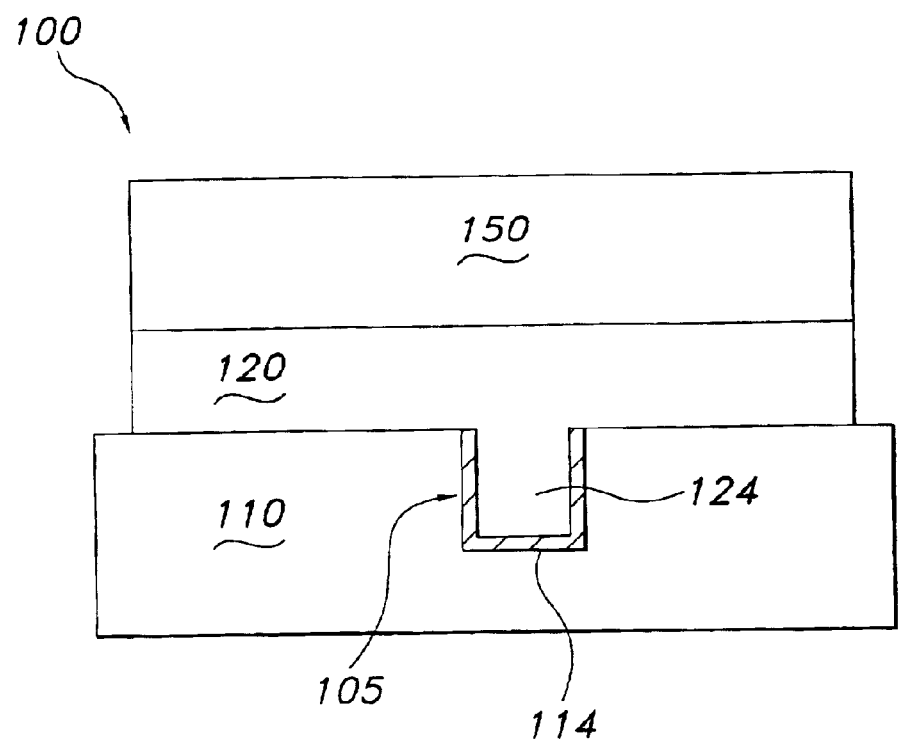
FIG. 6 is a side view of the optical device package showing the lid mounted to the structure illustrated in FIG. 5.

Referring now to FIGS. 1 and 6, a lid 150 is preferably bonded to the frame 120 to form an enclosure. Together with frame 120, lid 150 forms a cover structure for sealing the optical components (optical fiber stub 130, optical semiconductor component 140, etc.) within the enclosure. Lid 150 can be fabricated as a flat plate from any suitable fluid impervious material such as silicon, glass, ceramic, metal, and the like. Lid 150 can be bonded to frame 120 by any suitable means such as bonding with a bonding material such as solder metal, solder glass frit, adhesives such as epoxy, BCB, and the like. The top surface of frame 120 can optionally be metallized or roughened to facilitate adhesion of the bonding material. Upon completion of assembly, the electrical leads 145 can be electrically connected to an electric circuit (not shown) by conventional means. The lid 150 is typically bonded to frame 120 at a temperature lower than that at which the frome 120 is bonded to substrate 110. Use of frame 120 enables the bonding of the optical fiber 130 and the optical semiconductor component 140 to be performed in different steps at different temperatures. The multistep assembly is advantageous because optical semiconductor components are generally more sensitive to higher temperatures and are subject to damage at bonding temperatures which optical fibers can readily tolerate.

Figure 7:
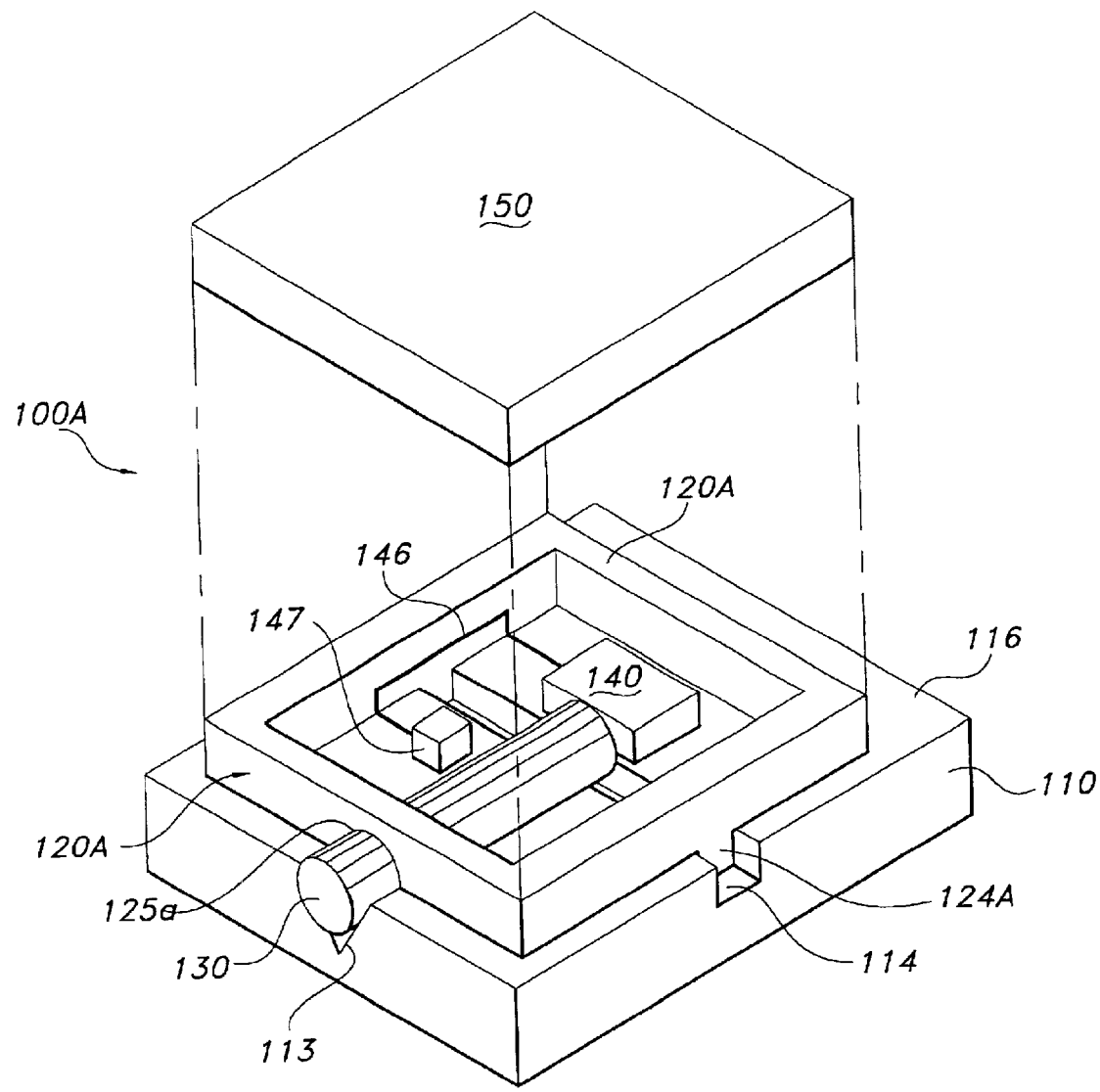
FIG. 7 is an exploded perspective view of an alternative embodiment of the optical device package in accordance with the disclosure.

Referring now to FIG. 7, in an alternative embodiment 100A of the optical device package includes electrical connections such as conductive metal trace 146. Trace 146 is preferably a metal film which extends at least partially across the upper surface 116 of the substrate 110 between the optical semiconductor component 140 and an electronic component 147 for performing such functions as, for example, modifying, filtering, or switching the electrical signal to or from the optical semiconductor component 140. Electronic components for performing such functions are known in the art. Preferably frame 120A is a ceramic with internal electrical connections. The internal electrical corrections can be made by incorporating conductive metals into the frame when the ceramic material is in a malleable, unhardened state. For example, in a preferred method, the frame 120A is fabricated from "green sheets" of ceramic precursor such as alumina, aluminum nitride, silicon carbide, and the like. The green sheets are flexible and easily processed either by cutting, punching holes in them, bending, etc. Conductive paste can be applied to the sheets to form conductive paths. Holes can be filled with paste and paste can be patterned onto the sheets by silk screening and the like. The sheets can be stacked, laminated and then sintered at a suitably high temperature to form a solid ceramic structure. Frame 120A also preferably includes at least one downwardly extending projection 124A for engaging the lateral end portion of laterally extending notch 114 and a recess 125A for accommodating the optical fiber 130.

Incorporation of electrical connecting lines such as metal trace 146 in the frame allows the electrical connection to bridge lateral groove 114. This feature provides more efficient use of valuable surface area within the optical device package by permitting electronic components (e.g. component 147) to be positioned on the upper surface 116 proximal to the lateral groove 114 and to be electrically connected to optical semiconductor component 140 positioned on the upper surface 116 distal to the lateral groove 114.

While the above description contains many specifics, these specifics should not be construed as limitations on the scope of the invention, but merely as exemplifications of preferred embodiments thereof. For example, multiple optical device packages can be made in a batch type process from a single wafer. The frames for the individual device packages can be initially joined together in a multiframe network which is mounted to the wafer and aligned such that the individual frames are secured to respective individual optical device packages. The individual optical device packages can be divided into separate units after assembly by means of a dicing saw or other suitable technique. Those skilled in the art will envision many other possibilities within the scope and spirit of the invention as defined by the claims appended hereto.

What is claimed is:

1. An optical device package which comprises:
   a) a substrate comprising an upper surface, an electrical lead on the upper surface, and a longitudinal notch extending from a proximal end of the substrate to a lateral groove which is at least partially defined by a proximal facing stop surface;
   b) an optical fiber positioned within the longitudinal notch; and,
   c) a frame mounted to the upper surface of the substrate, the frame comprising at least one downwardly extending projection engaged in at least one lateral end portion of the lateral groove.

2. The optical device package of claim 1 further comprising an optical semiconductor component mounted to the upper surface of the substrate distal of the lateral groove, the optical semiconductor component being operatively aligned with the optical fiber.

3. The optical device package of claim 1 wherein the downwardly extending projection has a rectangular shape.

4. The optical device package of claim 1 wherein the optical fiber has a distal end abutting the proximal facing stop surface of the substrate.

5. An optical device package which comprises:
   a) a substrate comprising an upper surface and a longitudinal notch extending from a proximal end of the substrate to a lateral groove which is at least partially defined by a proximal facing stop surface;
   b) an optical fiber positioned within the longitudinal notch;
   c) a frame mounted to the upper surface of the substrate, the frame comprising at least one downwardly extending projection engaged in at least one lateral end portion of the lateral groove;
   d) an optical semiconductor component mounted to the upper surface of the substrate distal of the lateral groove, the optical semiconductor component being operatively aligned with the optical fiber; and
   e) a lid mounted to the frame so as to define an inner space wherein the optical semiconductor component and at least a portion of the optical fiber are enclosed.

6. The optical device package of claim 1 wherein the frame comprises a single piece member defining an opening, and comprising at least two downward pointing projections engaged respectively in opposite lateral end portions of the lateral groove.

7. The optical device package of claim 6 wherein the frame further comprises a recess for engaging an upper portion of the optical fiber.

8. An optical device package which comprises:
   a) a substrate comprising an upper surface and a longitudinal notch extending from a proximal end of the substrate to a lateral groove which is at least partially defined by a proximal facing stop surface;
   b) an optical fiber positioned within the longitudinal notch; and
   c) a frame mounted to the upper surface of the substrate, the frame comprising internal electrical connections.

9. The optical device package of claim 8 wherein the frame is fabricated from ceramic.

10. The optical device package of claim 9 further comprising an electronic component.

11. The optical device package of claim 1 wherein the frame possesses a quadrilateral shape.

12. The optical device package of claim 1 wherein the substrate is fabricated from single crystal silicon.

13. The optical device package of claim 2 wherein the optical semiconductor component is selected from the group consisting of a laser diode, light emitting diode and photodetector.

14. The optical device package of claim 1 further comprising a ferrule disposed between the frame and the substrate, wherein the optical fiber is disposed through a bore in the ferrule.

15. An optical device package which comprises:
   a) a substrate comprising an upper surface, an electrical lead on the upper surface, and a longitudinal notch extending from a proximal end of the substrate to a lateral groove which is at least partially defined by a proximal facing stop surface;
   b) an optical fiber positioned within the longitudinal notch; and,
   c) a frame mounted to the upper surface of the substrate, the frame comprising a recess for engaging an upper surface of the optical fiber and at least one downwardly extending projection engaged in at least one lateral end portion of the lateral groove.

16. A method for making an optical device package comprising:
   a) mounting an optical fiber in a longitudinal notch in an upper surface of a substrate such that a distal end of the fiber abuts a proximally facing stop surface which at least partially defines a laterally extending groove;

b) forming at least one electrical lead on the upper surface of the substrate;

c) mounting an optical semiconductor component to the upper surface of the substrate distal to the lateral groove such that the optical semiconductor component is in contact with the at least one electrical lead and is operatively aligned with the optical fiber;

d) fixedly mounting a frame to the upper surface of the substrate, the frame having at least one downwardly extending projection configured and dimensioned to engage a lateral end portion of the laterally extending groove; and e) fixedly mounting a lid to the frame.

17. The method of claim 16 wherein the substrate is single crystal silicon and the upper surface is in the (100) crystallographic plane.

18. The method of claim 17 wherein the longitudinal notch of the substrate is formed by masking the substrate and etching the substrate in the (111) crystallographic planes.

19. The method of claim 16 wherein the frame is fabricated by providing a plurality of green sheets of ceramic precursor, forming the green sheets, stacking the green sheets, and sintering the green sheets to form a solid ceramic structure.

20. The method of claim 19 further including the step of applying a conductive paste to one or more green sheets prior to stacking and sintering the green sheets.

21. The method of claim 16 wherein the step of fixedly mounting the frame is performed by bonding the frame to the substrate with a material selected from the group consisting of solder metal, solder glass frit, BCB and epoxy resin.

22. The method of claim 16 wherein the frame has two downwardly extending projections configured and dimensioned to engage respective opposite lateral end portions of the laterally extending groove.

* * * * *